United States Patent [19]
Layne

[11] Patent Number: 4,789,219
[45] Date of Patent: Dec. 6, 1988

[54] GRADIENT INDEX RETROREFLECTOR
[75] Inventor: Clyde B. Layne, Livermore, Calif.
[73] Assignee: The United States of America as represented by the United States Department of Energy, Washington, D.C.
[21] Appl. No.: 836,882
[22] Filed: Mar. 6, 1986
[51] Int. Cl.[4] .................. G02B 5/12; G02B 5/136; G02B 17/00
[52] U.S. Cl. .................. 350/97; 350/109; 350/413; 350/446
[58] Field of Search .............. 350/97, 106, 413, 96.15, 350/96.16, 96.18, 104, 416, 446, 109

[56] References Cited
U.S. PATENT DOCUMENTS

| 2,866,971 | 12/1958 | Kelleher | 350/104 |
|---|---|---|---|
| 2,921,305 | 1/1960 | Cole et al. | 350/104 |
| 3,405,025 | 10/1968 | Goldman . | |
| 3,964,820 | 6/1976 | Eigenmann . | |
| 3,980,393 | 9/1976 | Heasley et al. . | |
| 4,072,403 | 2/1978 | Eigenmann . | |
| 4,208,094 | 6/1980 | Tomlinson, III et al. . | |
| 4,213,677 | 7/1980 | Sugimoto et al. | 350/96.18 |
| 4,349,598 | 9/1982 | White . | |
| 4,381,137 | 4/1983 | Berg et al. | 350/162.12 |

FOREIGN PATENT DOCUMENTS

| 2745940 | 4/1978 | Fed. Rep. of Germany | 350/96.18 |
|---|---|---|---|
| 0121403 | 9/1980 | Japan | 350/96.18 |
| 581697 | 10/1946 | United Kingdom | 350/106 |

OTHER PUBLICATIONS

International Fiber Optics and Communication, vol. 3, No. 2, p. 51, Mar./Apr. 1982, Selfoc Graded Index Lenses, Mack.
A Preliminary Study of a Retroreflective Mirror Resonator, E. K. Gorton et al., Optics Communications, vol. 46, No. 2, 15 Jun. 1983.
Corner Cube Array Coat, Sato et al., Applied Optics, vol. 21, No. 10, May 15, 1982, p. 1778.
Wavefront Compensation with Pseudoconjugation, T. R. O'Meara, Optical Engineering, Mar.-Apr. 1982, vol. 21, No. 2 / 271.
Paraxial Ray Analysis of a Cat's-Eye Retroreflector, Snyder, Applied Optics, Aug. 1975, vol. 14, No. 8, p. 1825.
Simple Model of Corner Reflector Phenomena, H. D. Eckhardt, Applied Optics, Jul. 1971, vol. 10, No. 7, p. 1559.
Wavefronts and Construction Tolerances for a Cat's-Eye Retroreflector, Beer et al., Applied Optics, Jul. 1966, vol. 5, No. 7, p. 1191.

Primary Examiner—John K. Corbin
Assistant Examiner—Ronald M. Kachmarik
Attorney, Agent, or Firm—Anne D. Daniel; James H. Chafin; Judson R. Hightower

[57] ABSTRACT

A retroreflector is formed of a graded index lens with a reflective coating at one end. The lens has a length of an odd multiple of a quarter period thereof. Hexagonally shaped graded index lenses may be closely packed in an array to form a retroreflecting surface.

14 Claims, 2 Drawing Sheets

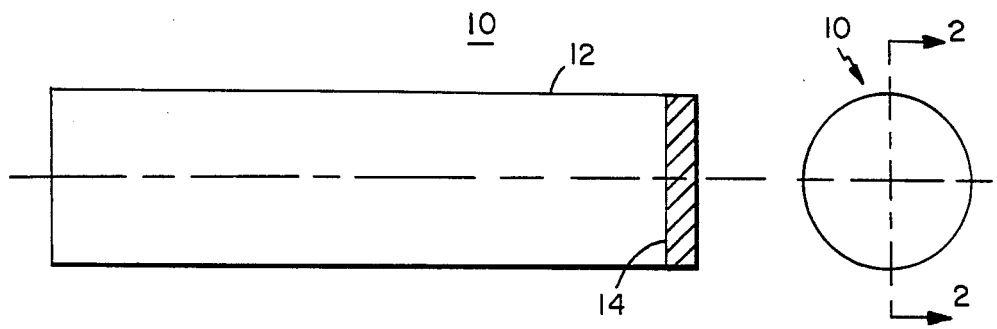
FIG. 2
FIG. 1
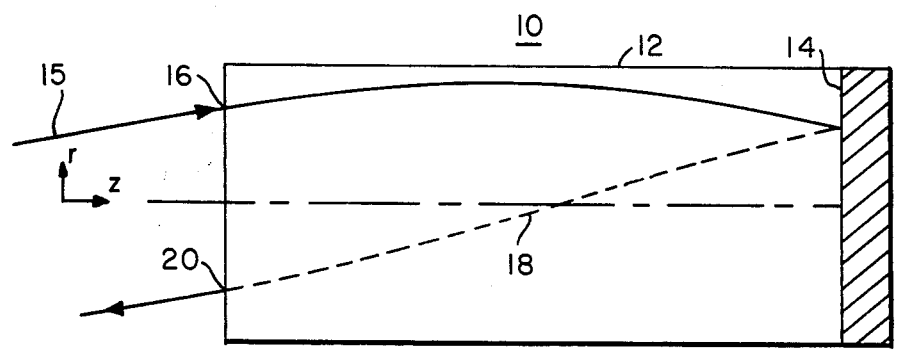
FIG. 3
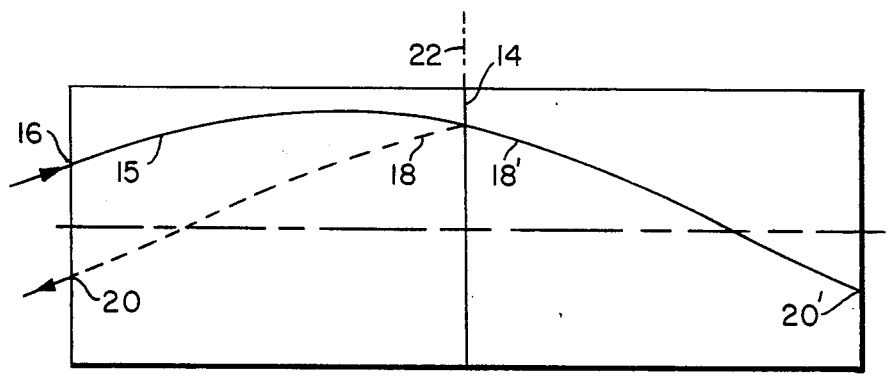
FIG. 4

GRADIENT INDEX RETROREFLECTOR

The U.S. Government has rights in this invention pursuant to Contract No. DE-AC04-76DP00789 between the U.S. Department of Energy and AT&T Technologies, Inc.

TECHNICAL FIELD

This invention relates to reflective devices, and more particularly to devices for reflecting a beam of incident energy in a direction substantially parallel and opposite to the direction of the incident beam.

BACKGROUND ART

Retroreflectors, which are devices for returning a beam of incident energy and preferably incident light in a direction parallel to the incident beam, are well known in the art. Typical retroreflectors are known to utilize corner cubes or right triangle prisms, as illustrated in White U.S. Pat. No. 4,349,598 and in Heasley et al U.S. Pat. No. 3,980,393.

As is known in the art, such devices rely on repeated internal reflection of an incident ray by a number of reflecting surfaces to obtain the appropriate reflected ray. Such an arrangement, as shown in U.S. Pat. No. 3,980,393, may be combined with a forward lens in order to indicate a reflective area larger than the actual area of the cube-corner array used therein.

Other retroreflective devices are known to utilize glass beads adjacent a reflective material to provide reflection in the desired direction. Such devices are typically identified by the terminology "cat's-eye" retroreflectors and are analyzed in "Paraxial Ray Analysis Of A Cat's-eye Retroreflector", J. J. Snyder, *Applied Optics*, Volume 14 No. 8, page 1825 (1975). Glass spheres or beads may be used to replace the cat's-eye lens, as described in Eigenmann U.S. Pat. Nos. 3,964,820 and 4,072,403, and in Goldman U.S. Pat. No. 3,405,025, respectively.

However, both the cube-corner type reflector and the cat's-eye type reflector suffer disadvantages. For example, it is difficult to construct small size cube-corners and to assemble the same into an array. Moreover, internal corners of the cubes so assembled provide interference fringes in the reflected ray. Yet another difficulty with cube-corner reflectors is the requirement for three optically flat and reflectively coated surfaces intersecting at precisely orthogonal angles. Production of small sized and high quality orthogonal intersections of three such optically flat surfaces, required to form a pseudoconjugator array of the type described in "Wavefront Compensation with Pseudoconjugation," T. R. O'Meara, *Optical Engineering* 21, 271 (1982), is particularly difficult.

Such difficulties lead to inaccuracies of results provided in precise applications such as surveying and metrology, image processing, optical communications and other laser systems.

Additionally, in cat's-eye type reflectors utilizing glass beads, it is difficult to return large fractions of the incident light in a very small angle about the incident direction. Further, such retroreflectors require two precision finished lens surfaces and a precision finished mirror surface for the standard lens-mirror configuration. Additionally, a fixture is required to align and hold the lens in position in front of the mirror. When an array of such retroreflectors is desired, such positioning is even more difficult.

Thus, the prior art retroreflectors cannot readily be used in high precision applications such as coherent light image processing.

The prior art describes a graded refractive index rod or lens element, known by the acronym GRIN, in which an optical beam follows a substantially sinusoidal path during axial propagation. GRIN rods are described for use as image relays in "Analysis Of Refractive Index Distributions In Cylindrical, GradedIndex Glass Rods (GRIN rods) Used As Image Relays", Rawson et al, *Applied Optics* Volume 9, page 753 (1970). Tomlinson, III et al disclose the use of such a GRIN rod as an optical switch in U.S. Pat. No. 4,208,094. More specifically, an optical source and a plurality of optical receptors are mounted at one surface of the GRIN lens. The source is located at the lens axis and the receptors are peripherally distributed thereabout. At the opposite end of the GRIN rod is provided an angled reflector, rotatable substantially about the lens axis, for reflecting and directing light received from the light source to individual ones of the light receptors along the periphery of the opposing surface.

Although useful and interesting, such a device is incapable of functioning as a retroreflector.

There is thus a need in the prior art for an easily manufactured, compact, accurate and highly reflective retroreflector which may easily be assembled into an array to provide a retroreflective surface.

DISCLOSURE OF INVENTION

Accordingly, it is a primary object of the present invention to overcome the difficulties of the prior art and to provide an easily manufactured, easily assembled retroreflector device capable of production in reduced dimensions.

It is a more specific object of the invention to provide a retroreflector for returning a large fraction of a beam of incident light to the source of the beam in a path substantially parallel and opposite to the path of the incident beam by passing the beam to a reflector through material having a graded index of refraction and by returning the beam through such material in order to provide the desired directionality.

It is another object of the invention to provide a retroreflective device formed of a graded index lens with two surfaces, one surface receiving an incident beam of energy and the other surface coated to reflect energy passed thereto through the lens.

Yet another object of the invention is the provision of a retroreflective device having a length of an odd multiple of one quarter period in order to obtain reversal of direction upon reflection of the incident beam and double passage through the lens.

Still another object of the invention is the provision of an assembly of retroreflective devices, each formed as a gradient index rod having a length substantially equal to an odd multiple of one quarter period, and having a reflective surface coated thereon.

Still another object of the invention is the provision of an array of retroreflective devices, each formed to have a cross-section described by a regular polygon thus to permit the devices to be stacked together to form the array.

Additional objects, advantages, and other novel features of the invention will be set forth in part in the description which follows and in part will become apparent to those skilled in the art upon examination of the following or may be learned with the practice of the invention. The objects and advantages may be realized and attained by means of the instrumentalities and combinations particularly pointed out in the appended claims.

To achieve the foregoing and other objects, and in accordance with the purposes of the present invention as described herein, an improved retroreflective device is provided for reflecting a beam of incident irradiation in a direction substantially parallel but opposite to the incident direction. The improved device includes a graded index lens with a pair of surfaces arranged, respectively, for receiving the radiant energy beam and for reflecting the beam after passage through the graded index lens. The graded lens refracts the radiant beam in a transverse direction during the axial passage thereof through the lens.

Preferably, the graded index lens is formed as a gradient index rod having a length of an odd number of quarter periods, and more specifically a length of one quarter period. It is particularly contemplated that the radiant energy is reflected at one of the surfaces by a reflective coating provided thereon. In order to facilitate assembly of the devices into an array, it is preferred that a cross section of a regular polygon stackable to form a close packed array be provided for the gradient index rod, and more specifically that a hexagonal cross-section be provided therefor.

In accordance with another aspect of the invention, there is provided a retroreflective assembly formed as an array of a plurality of such gradient index rods having a reflective coating on one of the sides thereof.

It is contemplated that the rods, having the regular polygonal cross-sections, are arranged in a plurality of layers to present a retroreflecting surface.

In accordance with still another feature of the invention, there is provided a method for retroreflecting a beam of light by impinging the beam in an arbitrary direction on one surface of a graded refractive index lens. The beam is passed substantially axially through the graded refractive index lens towards a second surface and is reflected at the second surface. The reflected beam is passed substantially axially through the graded refractive index lens towards the first surface and is exited at the first surface in a direction substantially parallel to the arbitrary direction.

In accordance with yet another aspect of the invention, there is provided a method for making a retroreflective device by applying a reflecting means to one of the surfaces of a gradient index rod having a length substantially equal to an odd multiple of a quarter period. The rod may be obtained with the appropriate length or may be cut to the appropriate length and the reflective means may be applied by coating a reflective material on the surface.

Still other objects and features of the present invention will become readily apparent to those skilled in the art to which the invention pertains from the following description wherein a preferred embodiment of the invention is shown and described, simply by way of illustration of one of the best modes suited to carry out the invention. As will be realized, the invention is capable of still other, different, embodiments and its several details are capable of modifications in various obvious aspects, all without departing from the invention. Accordingly, the drawings and the descriptions will be regarded as illustrative in nature and not as restrictive.

BRIEF DESCRIPTION OF THE DRAWINGS

The accompanying drawings, incorporated in and forming a part of the specification, illustrate several aspects of the present invention and, together with the description, serve to explain the principles of the invention.

In the drawings:

FIG. 1 shows an end view of one embodiment of a retroreflector using a gradient index rod in accordance with the present invention;

FIG. 2 shows a sectional view of the retroreflector shown in FIG. 1;

FIG. 3 shows a path of an incident ray and a reflected ray through the body of the retroreflector section of FIG. 2;

FIG. 4 shows the path of the incident and reflected rays unfolded about an axis at the reflecting surface of FIG. 3;

DISCLOSURE OF INVENTION

Figure 5:
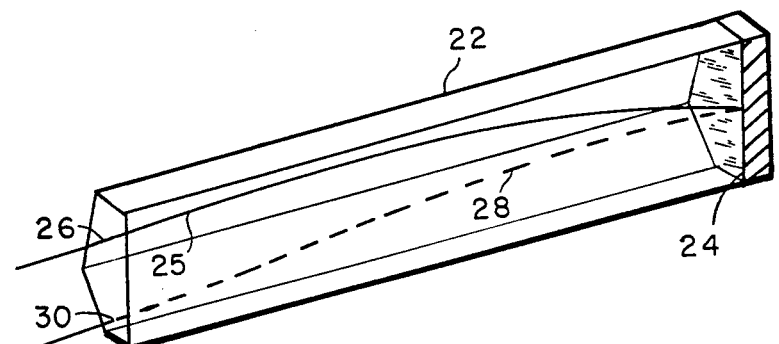
FIG. 5 shows a perspective view, partially in section, of a second embodiment of the invention and a path of incident and reflected rays therethrough.

Referring now to the first embodiment of the invention, a retroreflector device is generally shown at FIGS. 1–4 and is identified by reference numeral 10. As is more clearly seen in the sectional views of FIGS. 2 and 3, the inventive retroreflector device is comprised of a gradient index rod 12 having a reflective material 14 affixed to one end surface thereof. Preferably, the reflective material is coated on the end surface of the gradient index rod (GRIN rod).

As known in the art, ideally an index of refraction n for a gradient index rod varies in the radial direction r, shown at FIG. 3, in accordance with the following equation:

$$n(r) = n_0 \operatorname{sech}(gr) \quad (1)$$

where g is a characteristic of the index gradient of the rod. Thus, it is known that an incident meridional ray 15 entering the rod at its other end surface at a point 16, described by a radial position $r_i$ and a path slope $r'_i$, follows a sinusoidal path through the GRIN rod. The radial position and slope of the path are described by equations (2) as follows:

$$r(z) = r_i \cos(gz) + r'_i/g \sin(gz)$$

$$r'(z) = -gr_i \sin(gz) + r'_i \cos(gz) \quad (2)$$

The ray is reflected by the reflective material 14 and continues its sinusoidal path through the rod as a reflected ray 18, exiting the rod at an exit point 20 described by a radial position $r_o$ and by a slope $r'_o$. As will be shown in the sequel, selection of an appropriate length for the GRIN rod 12 results in a relationship between the input and output parameters for the incident and reflected rays as described in equations (3):

$$r_o = -r_i$$

$$r'_o = -r'_i. \quad (3)$$

In order better to follow the path of the incident and reflected rays, the sectional view of FIG. 3 is unfolded about an axis at the reflective surface of the rod. The axis is shown at 22 in FIG. 4.

For a reflective surface which is perpendicular to the axial direction z, and thus for an unfolding axis 22 which is perpendicular to the axial direction z, the dotted line path of reflected ray 18 shown in FIGS. 3 and 4 is a "mirror image" of the unfolded path 18' shown in FIG. 4. Thus, the path taken by the incident ray, both before and after reflection by the reflective material 14 on the surface of rod 12, is a continuous sinusoid, described by equations (2). The path may be analyzed in two ways. Initially, the radial displacement and the slope of the incident ray may be computed by equations (2) for the axial positioning of the reflective surface at 14. These values may then be used as initial values in a further application of equations (2) in which a new axial displacement z' is measured from the reflective surface. Alternatively, by recognizing that the path of the ray is a continuous sinusoid described by equations (2), the intermediate value of the displacement and slope at axis 22 need not be computed. Instead, the values of displacement and slope may be computed for a point 20', representing the unfolded version of exit point 20. The only difference between the thus computed parameters for the ray path and the parameters for the actual reflected ray exiting at point 20 is that travel along the ray path 18 is in a right-to-left direction while travel by the unfolded reflected ray 18' is in a left-to-right direction.

For a total distance of travel for the incident and reflected ray of L from point 16 to point 20', i.e., for twice the length of the GRIN rod, the output parameters $r_O$ and $r'_O$ are calculated by substituting $z=L$ in equations (2). As a result, it is seen that:

$$r_O(z) = r_i \cos(gL) + r'_i/g \sin(gL)$$

$$r'_O(z) = -gr_i \sin(gL) + r'_i \cos(gL) \quad (4)$$

It is to be noted that for a substitution:

$$L = (2n+1)\pi/g, \quad (5)$$

i.e., for a total path length of an odd integer multiple of half the period of the sinusoidal path, equations (4) identify the output parameters of the reflected ray at the unfolded point 20' as being:

$$r_O = -r_i$$
$$r'_O = -r'_i. \quad (6)$$

Upon folding the path shown in FIG. 4, that is, upon reflecting the portion 18' in FIG. 4 about axis 22 to obtain path 18 of the actual reflected ray, it is seen from equation (6) that the reflected ray exits at a point symmetrically placed with respect to axis z and having a direction equal but opposite to the direction of the incident ray. That is, application of a reflecting material to an end surface of a GRIN rod whose length is one half an odd integer multiple of half a period, alternatively stated as a length of an odd integer multiple of a quarter period, the device operates as a retroreflector. The above derivation was independent of the entry displacement and slope, although it is clear that the rod must have a larger diameter to provide retroreflection of incident rays entering at more severe angles with respect to normal or at points significantly displaced from the central axis thereof.

As an alternative indication of the retroreflection of the described structure, the radial displacement and slope at the reflecting surface are computed as follows.

For a GRIN rod having a length described by an integer odd multiple of one quarter period thereof, equations (2) yield path parameters for a value $z = (2n+1)\pi/2g$ as being:

$$r_I = r'_i/g$$
$$r'_I = -gr_i. \quad (7)$$

Using the values $r_I$ and $r'_I$ as the new initial conditions for equations (2), and considering the equations for a new axial length parameter z' measured from the reflecting surface at 14 in a right-to-left direction along reflected ray 18 in either FIG. 3 or FIG. 4, the reflected path is described by equations (8) as follows:

$$r(z') = r_I \cos(gz') + r'_I/g \sin(gz') = (r'_i/g)\cos(gz') - (r_i \sin gz')$$

$$r'(z') = -gr_I \sin(gz') + r'_{hd} I \cos(gz') = -r'_i \sin(gz') - gr_i \cos(gz'). \quad (8)$$

Upon substituting for the axial parameter z' the value at the exit point, $$z' = (2n+1)\pi/2g \quad (9)$$

for a rod length of one quarter period, the output parameters for the reflected ray at point 20 are found from equations (8) to be the same as equations (6).

Accordingly, it is confirmed that the structure shown in FIGS. 1–3, when provided with a length equal to an odd integer multiple of one quarter period thereof, and preferably a length of one quarter the period, in fact acts as a retroreflective device.

It should be noted that the preceding equations describe the paths of incident and reflected meridional rays and that in order to account for skew rays the optimum length or refractive index profile may be different from those hereinabove illustrated. Additionally, for gradient index rods which do not have the ideal refractive index profile previously described, the above approach may readily be modified to correspond to the actual profile and to consider deviations from parallel return caused by any errors in the profile, the rod length and the perpendicularity of the mirror surface to the z axis of the rod. It is further noted that an acceptance angle for a retroreflective device as hereinabove described is determined by calculations of vignetting for rays at large entrance angles. Finally, the specific range of wavelengths for which a specified performance is achieved may be determined by consideration of variation of any of the foregoing equations with wavelength.

From the above described computations it is noted that the reflected ray is returned at the same angle as the incident ray. However, for some applications it may be advantageous to return the rays in a larger cone of angles about the axis of the incoming beam. Variation of the rod length away from the exact quarter pitch length hereinabove considered would modify the initial conditions derived at the reflecting surface as shown at equations (7) for computation of the path parameters in equations (8).

Performance of an ideal retroreflector in accordance with the previous description would be defined by a uniform plane wave incident on the device being returned exactly parallel to the incident wave and with a spread given by the diffraction limited divergence of a circular aperture of the same diameter as the gradient index rod. However, such a result may be appropriately modified for off-axis illumination to an elliptical aperture.

Figure 6:
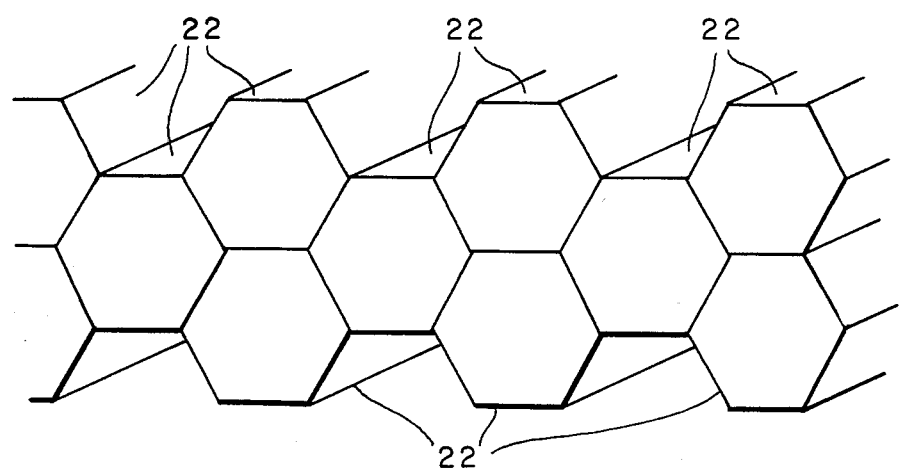
FIG. 6 shows a retroreflector assembly including an array of retroreflector devices of the type shown in FIG. 5.

Having described one embodiment of the invention, reference is now made to a second embodiment and a utilization thereof, shown at FIGS. 5 and 6, respectively.

FIG. 5 illustrates in perspective a sectional view of a gradient index rod which has a polygonal, rather than a circular, cross-section. The gradient index rod, shown at 22, is provided with a coating 24 of reflective material at one axial end and receives an incident ray 25 entering at point 26. The incident ray 25 is reflected by the reflective material 24 and a reflected ray 28 exits the rod 22 at exit point 30.

The difference between the embodiment of FIG. 5 and that of FIGS. 1-4, and most particularly of the illustration of FIG. 1, is the provision for the rod of a regular polygon cross-section illustrated as a hexagonal cross-section.

In order to provide a retroreflective layer or surface, a plurality of gradient index rods are required to be adjacent one another. In order to provide maximum, reflectivity any space between adjacent rods should be eliminated. The placement of a plurality of circular cylindrical rods in an array results in gaps between the circumferential portions of each of the adjacent rods. However, by grinding the rods into a regular polygonal shape, such as a hexagon, inter-rod spacing is substantially eliminated and the rods may be closely packed as illustrated at FIG. 6 to provide an array, or a retroreflective surface. Other regular polygon cross sections may be used. For example, rods having cross sections in the shape of triangles or squares may be closely packed and are useful in the present invention.

There has thus been disclosed a novel retroreflective device, formed of a gradient index rod having a predetermined length, and preferably a length determined by an integer odd multiple of one quarter the pitch length thereof. From the foregoing description, it is apparent that such retroreflectors may easily be manufactured in relatively small size and further may easily be assembled into an array to provide a retroreflective surface. Gradient index rods are presently available in sizes having diameters ranging from 1 to 2 millimeters, which may easily be cut to the correct length to provide an accurate of reduced size, retroreflector. As hereinabove described, although the preferred length is an odd multiple of one quarter pitch, for specified applications it may be advantageous to utilize a different predetermined length. Further, although the preferred reflector at the rear surface of the rod is a mirror surface coated thereon, it will be recognized that a reflective surface may be butted against the rod, and that reflection similarly may take place at the interface between the rod and a surrounding medium, without application of a particular reflective surface thereto. Additionally, for a retroreflective array, a reflective coating may be applied to the array after assembly of the individual rods into the close-packed configuration.

Advantageously, in the present invention a coating is required only over the rear surface and not the front surface, although it should be noted that an anti-reflective coating may be provided to the entering surface if desired. Significantly, only two surfaces of the retroreflector require optical finishing, and the two surfaces are both flat. Moreover, flatness is important at the rear surface over less than the full aperture inasmuch as the rays are focused onto a small area on the reflective surface, with the maximum radius of the focusing area depending on the acceptance angle of the device.

The foregoing description of the preferred embodiments of the invention has been presented for purposes of illustration and description. The description is not intended to be exhaustive or to limit the invention to the precise form disclosed, and several modifications or variations therein are described. Other modifications or variations will be obvious to those skilled in the art. The preferred embodiments were chosen and described to provide the best illustration of the principles of the invention and its practical application, thereby to enable one of ordinary skill in the art to utilize the invention in various embodiments and with various modifications best suited to the particular use contemplated. Any such modifications are included within the scope of the invention as defined by the claims appended hereto.

I claim:

1. A retroreflective device comprising:
   graded index lens means having opposed first and second planar surfaces,
   said first surface arranged for receiving a beam of irradiation in any arbitrary direction,
   said graded index lens means variably refracting said irradiation transversely during substantially axial passage to said second surface,
   reflecting means covering entirely said second surface for reflecting said refracted irradiation through said lens means to exit said lens means at said first surface in a direction substantially parallel to said arbitrary direction.

2. A retroreflective device as recited in claim 1 wherein said graded index lens means comprises a gradient index rod having a length of an odd multiple of a quarter period thereof.

3. A retroreflective device as recited in claim 1 wherein said graded index lens means comprises an optical gradient index rod having a regular polygonal cross section.

4. A retroreflective device as recited in claim 3 wherein said gradient index rod has a hexagonal cross section.

5. A retroreflective assembly comprising:
   an array formed of a plurality of graded index lens means, each of said means comprising a gradient index rod with opposed first and second surfaces for receiving rays of electromagnetic radiation at the respective first surfaces thereof in any arbitrary direction relative to a normal of said first surfaces and for variably refracting said rays transversely during substantially axial passage to said second surface thereof,
   reflecting means entirely covering the respective second surfaces for reflecting said rays through said respective lens means substantially axially towards said respective first surfaces to subject said rays to further variable transverse refraction and to cause said rays to exit said lens means at said first surfaces in a direction substantially parallel to said arbitrary direction.

6. A retroreflective assembly as recited in claim 5 wherein said reflecting means comprises a reflective coating covering entirely each of said second surfaces.

7. A retroreflective assembly as recited in claim 5 wherein said gradient index rods are optical rods having a length of substantially one quarter period thereof.

8. A retroreflective assembly as recited in claim 5 wherein said gradient index rods are arranged in a plurality of layers.

9. A retroreflective assembly as recited in claim 8 wherein said gradient index rods have cross sections described by regular polygons.

10. A method of retroreflecting a ray comprising the steps of:
 (a) impinging said ray in any arbitrary direction on a first planar surface of a graded refraction index lens means,
 (b) passing said ray substantially axially through said graded refraction index lens means towards a second planar surface thereof, said second surface being entirely covered by a reflective coating,
 (c) reflecting said ray at said second surface,
 (d) passing said reflected ray substantially axially through said graded refraction index lens means towards said first surface thereof, and
 (e) exiting said ray from said graded refraction index lens means at said first surface in an exit direction substantially parallel to said arbitrary direction.

11. A method of retroreflecting a ray as recited in claim 10 wherein said graded refraction index lens means has a length substantially equal to an odd integer mutliple of one quarter period thereof and said first and second mentioned passing steps each comprise a step of passing said ray through a length substantially equal to an odd integer multiple of one quarter period of said graded refraction index lens means.

12. A method of retroreflecting a ray as recited in claim 10 wherein said graded refraction index lens means has a length substantially equal to one quarter period thereof and said first and second mentioned passing steps each comprise a step of passing said ray through a length substantially equal to one quarter period of said graded refraction index lens means.

13. A method of retroreflecting a ray as recited in claim 12 wherein said graded refraction index lens means comprises an optical lens means and said impinging step comprises the further step of applying an optical ray to said first surface of said lens means.

14. A method of retroreflecting a ray as recited in claim 10 wherein said graded refraction index lens means comprises an optical lens means and said impinging step comprises the further step of applying an optical ray to said first surface of said lens means.

* * * * *